US010171279B2

(12) United States Patent
Suzuki et al.

(10) Patent No.: US 10,171,279 B2
(45) Date of Patent: Jan. 1, 2019

(54) TRANSMITTER AND RECEIVER

(71) Applicant: Mitsubishi Electric Corporation, Chiyoda-ku (JP)

(72) Inventors: Kazumasa Suzuki, Tokyo (JP); Kazuaki Ishioka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/554,270

(22) PCT Filed: Apr. 9, 2015

(86) PCT No.: PCT/JP2015/061060
§ 371 (c)(1),
(2) Date: Aug. 29, 2017

(87) PCT Pub. No.: WO2016/162993
PCT Pub. Date: Oct. 13, 2016

(65) Prior Publication Data
US 2018/0054343 A1 Feb. 22, 2018

(51) Int. Cl.
*H04L 27/26* (2006.01)
*H04J 11/00* (2006.01)
*H04L 1/20* (2006.01)
*H04L 5/00* (2006.01)

(52) U.S. Cl.
CPC .......... *H04L 27/2691* (2013.01); *H04J 11/00* (2013.01); *H04J 11/0023* (2013.01);
(Continued)

(58) Field of Classification Search
USPC ......................................... 375/296
See application file for complete search history.

(56) References Cited

U.S. PATENT DOCUMENTS

| 5,771,224 A | 6/1998 | Seki et al. |
| 2005/0286408 A1 | 12/2005 | Jin et al. |

(Continued)

FOREIGN PATENT DOCUMENTS

| CN | 1973459 A | 5/2007 |
| CN | 101636947 A | 1/2010 |

(Continued)

OTHER PUBLICATIONS

Kazumasa Suzuki et al., Study of Wireless Communication System Having Interference Resilience, Dec. 2012, IEICE, Technical Report, vol. 114, No. 368, pp. 77-81.*

(Continued)

*Primary Examiner* — Wednel Cadeau
(74) *Attorney, Agent, or Firm* — Oblon, McClelland, Maier & Neustadt, L.L.P.

(57) ABSTRACT

A transmitter includes: a null symbol map unit to determine a null symbol arrangement pattern by combining different unit patterns determining positions of data symbols and null symbols; a subcarrier map unit to assign, in a two-dimensional space defined by a plurality of subcarriers for use in multicarrier transmission and a time series represented in units of time determined in accordance with a single symbol, transmission data to positions of data symbols of the respective subcarriers determined in accordance with the null symbol arrangement pattern; a modulator to generate the data symbols by modulating the assigned transmission data, assign null symbols having a power of 0 to positions of null symbols of the respective subcarriers determined in accordance with the null symbol arrangement pattern, and generate transmission symbols of the respective subcarriers; and a baseband section to output a baseband signal based on the transmission symbols.

4 Claims, 7 Drawing Sheets

(52) U.S. Cl.
CPC ........... *H04L 1/20* (2013.01); *H04L 5/001*
(2013.01); *H04L 27/2602* (2013.01); ***H04L
27/2628*** (2013.01)

(56) References Cited

U.S. PATENT DOCUMENTS

| | | | |
|---|---|---|---|
| 2009/0129495 A1* | 5/2009 | Jin | H04L 1/0618 375/260 |
| 2010/0048151 A1* | 2/2010 | Hara | H04J 11/0056 455/115.1 |
| 2011/0003551 A1 | 1/2011 | Kameno et al. | |
| 2016/0241351 A1 | 8/2016 | Suzuki et al. | |

FOREIGN PATENT DOCUMENTS

| | | |
|---|---|---|
| JP | 08-265293 A | 10/1996 |
| JP | 2008-503974 A | 2/2008 |
| JP | 2009-147498 A | 7/2009 |
| JP | 4906875 B2 | 3/2012 |
| WO | 2008/099785 A1 | 8/2008 |
| WO | 2009/096319 A1 | 8/2009 |
| WO | 2015/045585 A1 | 4/2015 |

OTHER PUBLICATIONS

Suzuki, et al., "*A Study on Wireless Communication System with Interference Resilience*", IEICE Technical Report, Dec. 11, 2014, vol. 114, No. 368, pp. 77 to 81.

Office Action dated Nov. 10, 2015 in Japanese Patent Application No. 2015-546357 (with English translation).

International Search Report dated Jun. 23, 2015 in PCT/JP2015/061060, filed on Apr. 9, 2015.

Office Action dated Aug. 28, 2018 in Chinese Application No. 201580078415.3 (w/English translation).

* cited by examiner

TRANSMITTER AND RECEIVER

FIELD

The present invention relates to an interference power measurement technique for a multicarrier transmission system.

BACKGROUND

In recent years, a wireless train control system has been attracting attention. Specifically, wireless communication is performed between a wireless base station installed along a railroad track and a train (between the ground and a car), and the operation and speed of the train are controlled on the basis of information transmitted through the wireless communication. The wireless train control system is advantageous in terms of introduction and maintenance costs because it does not require a track circuit, as compared with a conventional train control system based on a fixed block section. Since the block section can be flexibly constructed without being limited to the fixed section, the density of train operation can be increased. Therefore, the wireless train control system is also advantageous in terms of operational costs.

In the wireless train control system, the industry science medical (ISM) bands which do not require a license are often used for the wireless communication between the ground and a car. However, the ISM bands are widely used in other communication systems such as a wireless local area network (LAN) conforming to the IEEE 802.11 standard and Bluetooth (registered trademark), and instruments for these other communication systems located in a train or a railroad building may be a major source of interference for the wireless communication of the wireless train control system. In the wireless train control system, interference resistance of a wireless communication device is an important factor for the stable wireless communication between the ground and a car.

A method for use in a multicarrier transmission system such as orthogonal frequency division multiplexing (OFDM) has been proposed as a technique for increasing the interference resistance performance of a wireless communication device and achieving high-quality communication (Patent Literature 1). Specifically, on the transmission side, null symbols are distributed within a time frame defined by a frequency axis and a time axis by using an arrangement pattern stored in a memory. On the reception side, the interference power is measured at each of the positions of the null symbols within the time frame, whereby a highly accurate interference power value is acquired, and the acquired interference power value is used for a transmission control process and a synthesis process between antennas.

CITATION LIST

Patent Literature

Patent Literature 1: PCT Patent Application Laid-Open No. 2008/099785 (FIG. 1)

SUMMARY

Technical Problem

The conventional wireless communication device according to Patent Literature 1 described above poses the following problem: Since the null symbol arrangement pattern is stored in the memory, the memory requires a large amount of capacity in order to store the pattern of the entire time frame.

The present invention has been made to solve the above-mentioned problem, and an object of the present invention is to obtain a transmitter and a receiver that are capable of providing a wireless communication device in which the amount of memory required for storing the null symbol arrangement pattern is reduced.

Solution to Problem

This invention provides a transmitter comprising: a null symbol map unit to determine a null symbol arrangement pattern by combining at least two different unit patterns that determine positions of data symbols and null symbols; a subcarrier map unit to assign, in a two-dimensional space defined by a plurality of subcarriers for use in multicarrier transmission and a time series represented in units of time determined in accordance with a single symbol, transmission data to positions of data symbols of the respective subcarriers determined in accordance with the null symbol arrangement pattern; a modulation unit to generate the data symbols by modulating the transmission data assigned to the respective subcarriers, assign null symbols having a power of 0 to positions of null symbols of the respective subcarriers determined in accordance with the null symbol arrangement pattern, and generate transmission symbols of the respective subcarriers; and a baseband section to output a baseband signal on a basis of the transmission symbols generated by the modulation unit.

This invention a receiver comprising: a baseband section to acquire, from a baseband signal, reception symbols of respective ones of a plurality of subcarriers for use in multicast transmission; a null symbol map unit to determine a null symbol arrangement pattern by combining at least two different unit patterns that determine positions of data symbols and null symbols; and an interference measuring unit to measure powers of null symbols of the reception symbols of the respective subcarriers on a basis of the null symbol arrangement pattern, and acquire interference powers of data symbols of the reception symbols on a basis of the powers of the null symbols measured.

Advantageous Effects of Invention

According to the transmitter of the present invention, the plurality of different unit patterns is combined for determining the null symbol arrangement pattern for the transmission symbols of the respective subcarriers for multicarrier transmission. Therefore, it is unnecessary to store a null symbol arrangement pattern corresponding to a period longer than the period of the unit pattern, and the amount of memory can be reduced.

According to the receiver of the present invention, the plurality of different unit patterns is combined for determining the null symbol arrangement pattern for the respective subcarriers for the multicarrier transmission. Therefore, it is unnecessary to store a null symbol arrangement pattern corresponding to a period longer than the period of the unit pattern, and the amount of memory can be reduced.

DESCRIPTION OF EMBODIMENTS

Figure 1:
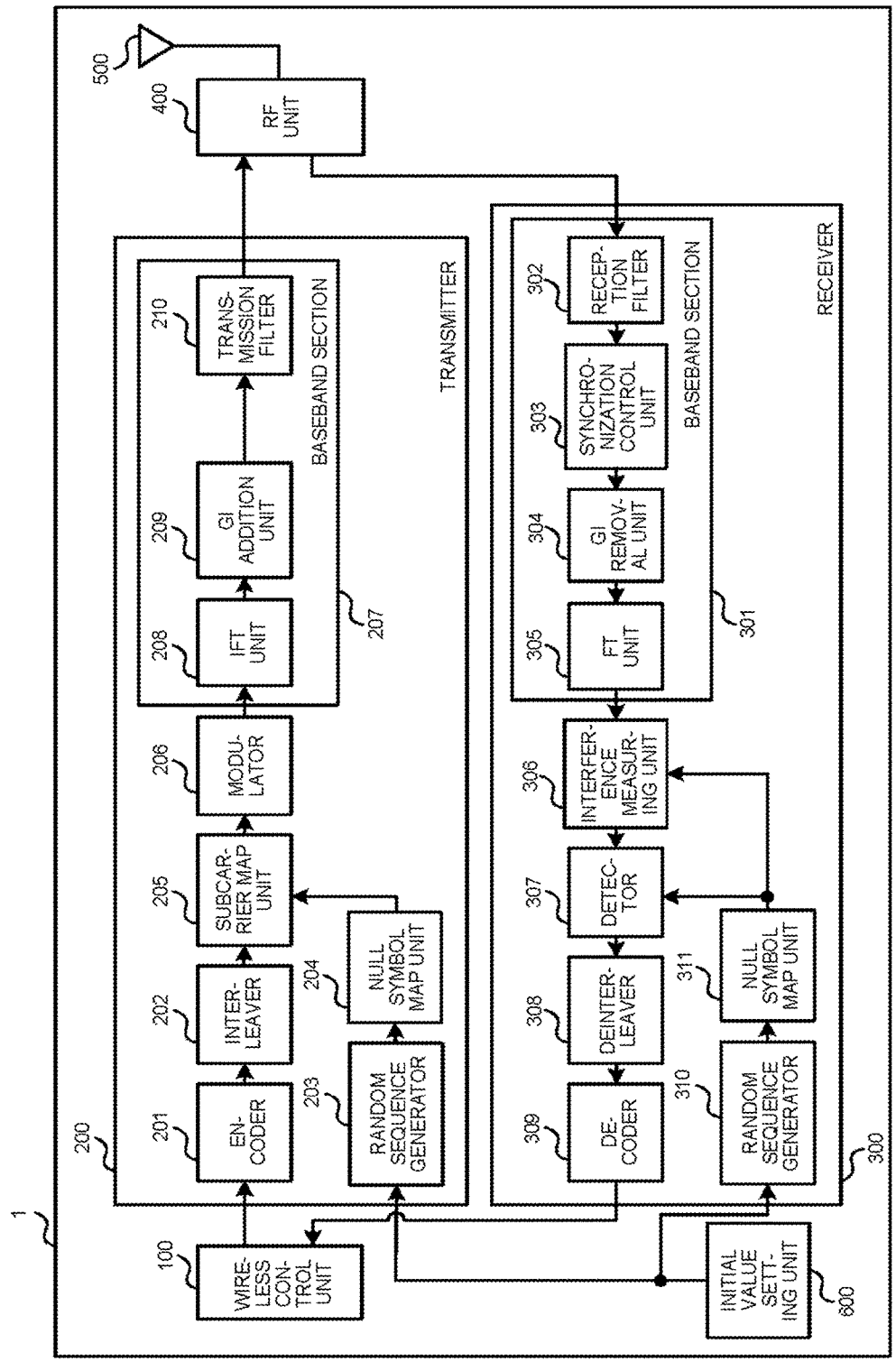
FIG. 1 is a block diagram illustrating an exemplary functional configuration of a wireless communication device to which a transmitter and a receiver according to a first embodiment of the present invention are applied.

Hereinafter, embodiments of the present invention will be described in detail based on the drawings. In the drawings referred to below, the same or corresponding components are denoted by the same reference signs.

First Embodiment

FIG. 1 is a block diagram illustrating an exemplary functional configuration of a wireless communication device including a transmitter and a receiver according to a first embodiment of the present invention. In the description of the following example, the wireless communication device uses orthogonal frequency division multiplexing (OFDM) as a multicarrier transmission system. However, the present invention is not limited to the OFDM, and may use another transmission system for modulating digital signals and transmitting these modulated signals over multiple carriers.

In the following description, with regard to each subcarrier for use in the multicarrier transmission, a symbol having a transmission power of 0 that does not transmit valid data is referred to as a null symbol, and a symbol for transmitting valid data is referred to as a data symbol. The time required for transmitting a single symbol through the multicarrier transmission is referred to as a single symbol time. In the present embodiment that uses the OFDM as the multicarrier transmission system, the time required for transmitting a single OFDM symbol is the single symbol time.

In FIG. 1, the wireless communication device 1 includes a wireless control unit 100, a transmitter 200, a receiver 300, a radio signal unit (radio frequency (RF) unit) 400, an antenna 500, and an initial value setting unit 600. The wireless control unit 100 is a block for controlling data that the wireless communication device 1 wirelessly transmits and receives. The wireless control unit 100 outputs transmission data to the transmitter 200, and receives input of reception data from the receiver 300. The transmitter 200 generates a signal (baseband signal) in a wirelessly transmittable format from the transmission data received from the wireless control unit 100, and outputs the baseband signal to the RF unit 400. The receiver 300 performs a demodulation process or the like on a baseband signal input from the RF unit 400 to acquire the reception data.

The wireless control unit 100 receives input of the transmission data from an upper-layer functional block (not illustrated), and outputs the reception data to the upper-layer functional block. The process that is performed by the upper-layer functional block on the transmission data or the reception data is not limited to a specific process as long as a necessary process is appropriately performed.

The RF unit 400 performs a digital-analog (DA) conversion on the baseband signal that is to be transmitted. The RF unit 400 also convers a frequency of this baseband signal into a carrier frequency, and amplifies the signal (radio signal) having the converted frequency. The RF unit 400 then outputs the amplified signal to the antenna 500. The RF unit 400 also receives input of a radio signal received at the antenna 500, and performs on the input radio signal a gain adjustment, a frequency conversion into a baseband frequency, and an analog-digital (AD) conversion to thereby generate the baseband signal. The RF unit 400 then outputs the generated baseband signal to the receiver 300. The antenna 500 radiates the wireless signal input from the RF unit 400 into the air through radio waves, and receives radio waves and thus acquires a radio signal. The antenna 500 then inputs the acquired radio signal to the RF unit 400. The initial value setting unit 600 sets an initial value for generating a pseudorandom sequence as described later for the transmitter 200 and the receiver 300.

In FIG. 1, an exemplary detailed functional configuration of each of the transmitter 200 and the receiver 300 is also illustrated. In FIG. 1, the transmitter 200 includes an encoder 201, an interleaver 202, a random sequence generator 203, a null symbol map unit 204, a subcarrier map unit 205, a modulator 206, and a baseband section 207. As an exemplary configuration, the baseband section 207 further includes an inverse Fourier transform unit (IFT unit) 208, an interval addition unit (GI addition unit) 209, and a transmission filter 210.

The encoder 201 performs error correction encoding on the transmission data from the wireless control unit 100. The error correction encoding can be performed simply by using a well-known encoding technique such as convolutional encoding. The convolutional encoding is used in this example. The interleaver 202 rearranges (interleaves) the data so that resistance to a burst error in a propagation channel is imparted to the encoded transmission data.

The random sequence generator 203 generates the pseudorandom sequence on the basis of the initial value provided by the initial value setting unit 600. The null symbol map unit 204 determines a null symbol arrangement pattern in accordance with the pseudorandom sequence generated by the random sequence generator 203. In a two-dimensional space defined by time (time series represented in units of single symbol time) and frequency (subcarrier for use in multicarrier transmission), the interleaved transmission data having the amount of data (data of a single OFDM symbol) transmitted by a single subcarrier in a single unit of time (single symbol time) is assigned by the subcarrier map unit 205 to each of the positions of data symbols determined in accordance with the null symbol arrangement pattern determined by the null symbol map unit 204.

The modulator 206 modulates the transmission data of a single OFDM symbol of each subcarrier, and generates a data symbol that is to be transmitted. The modulator 206 can perform the modulation simply by using a known modulation technique such as phase modulation and quadrature amplitude modulation (QAM). The modulator 206 performs the phase modulation in this example. A null symbol having a transmission power of 0, which is the symbol to be transmitted, is assigned to each of the positions of the null symbols determined by the null symbol arrangement pattern. The data and null symbols that are to be transmitted are collectively referred to as transmission symbols.

The baseband section 207 generates the baseband signal on the basis of the transmission symbols output from the modulator 206. Specifically, the IFT unit 208 performs the inverse Fourier transform on the transmission symbols of the respective subcarriers generated by the modulator 206 as a frequency domain signal by using the inverse fast Fourier transform (IFFT) to thereby convert the frequency domain signal into a time domain signal. Then, the GI addition unit 209 copies a part of the tail of the time domain signal subjected to the IFFT, adds the copied part to the head of the time domain signal as a guard interval (GI) for reducing the interference between OFDM symbols due to the multipath propagation channel, and generates an OFDM symbol.

The transmission filter 210 performs a filtering process on the signal (OFDM symbol) output from the GI addition unit 209 in order to suppress out-of-band leakage power. The transmission filter may not be required. The signal subjected to the filtering process by the transmission filter 210 is output to the RF unit 400 as the baseband signal. In the wireless communication, synchronization needs to be performed on the reception side as described later. Known techniques can be used as synchronization methods. In a case where a pilot signal known to the transmission side and the reception side is used as one of the known synchronization methods, the baseband section 207 only needs to include a preamble inserting unit so that a preamble for transmitting the pilot signal is inserted into each OFDM frame made of one or more OFDM symbols.

Referring again to FIG. 1, the receiver 300 includes a baseband section 301, an interference measuring unit 306, a detector 307, a deinterleaver 308, a decoder 309, a random sequence generator 310, and a null symbol map unit 311. As an exemplary configuration, the baseband section 301 further includes a reception filter 302, a synchronization control unit 303, a GI removal unit 304, and a Fourier transform unit (FT unit) 305.

The baseband section 301 outputs reception symbols of the respective subcarriers on the basis of the baseband signal input from the RF unit 400. Specifically, the reception filter 302 performs a filtering process to remove an out-of-band component of the baseband signal input from the RF unit 400. Then, the synchronization control unit 303 synchronizes the timing and frequency of the baseband signal subjected to the filtering process by the reception filter 302, and determines the boundary of an OFDM symbol. The timing and frequency can be synchronized simply by using a known synchronization method. For example, the synchronization may be performed in such a manner that a signal expected to have been transmitted from the transmission side is compared with a received signal using a pilot signal known to the transmission side and the reception side.

Next, the GI removal unit 304 removes a GI inserted on the transmission side, from the OFDM symbol on the basis of the boundary of the OFDM symbol determined by the synchronization control unit 303. The FT unit 305 uses the fast Fourier transform (FFT) to perform the Fourier transform on the signal of the OFDM symbol having the GI removed by the GI removal unit 304, thereby converting the signal into a frequency domain signal, and thus acquiring the reception symbols of the respective subcarriers.

The random sequence generator 310 and the null symbol map unit 311 are respectively similar to the pseudorandom generator 203 and the null symbol map unit 204 provided in the transmitter 200. With regard to the reception symbols of the respective subcarriers acquired by the FT unit 305, the interference measuring unit 306 measures the power of a null symbol on the basis of a null symbol arrangement pattern determined by the null symbol map unit 311, and acquires the interference power of a data symbol on the basis of the power of the null symbol.

On the basis of the interference power acquired by the interference measuring unit 306, the detection unit 307 detects (demodulates) the data symbol of the reception symbols converted by the FT unit 305 as the detection unit 307 weights the data symbol in consideration of the interference power. The detection unit 307 can perform the detection simply by using a demodulation technique corresponding to the modulation technique used on the transmission side. The detection unit 307 weights the data (demodulated data), which is obtained by demodulating the data symbol, in accordance with the interference power. The detection unit 307 then inputs this weighted data to the deinterleaver 308. The deinterleaver 308 rearranges (deinterleaves) the weighted detected data so that the data interleaved on the transmission side are restored to the original state. The decoder 309 performs an error correction on the deinterleaved weighted demodulated data in accordance with the encoding performed by the transmitter 200 that is an opposite device, and acquires the reception data. The type of error correction encoding is not particularly limited as long as the data can be decoded in consideration of the weight given to a code word. In this example, the decoder 309 decodes the data using a Viterbi decoding algorithm corresponding to the convolutional encoding.

The wireless control unit 100, the encoder 201, the interleaver 202, the random sequence generation unit 203, the null symbol map unit 204, the subcarrier map unit 205, the modulator 206, the IFT unit 208, the GI addition unit 209, and the transmission filter 210 constituting the transmitter 200, the reception filter 302, the synchronization control unit 303, the GI removal unit 304, the FT unit 305, the interference measuring unit 306, the detector 307, the deinterleaver 308, the decoder 309, the random sequence generator 310, and the null symbol map unit 311 constituting the receiver 300, the RF unit 400, and the initial value setting unit 600 illustrated in FIG. 1 can be implemented by hardware such as an application specific integrated circuit (ASIC).

Figure 9:
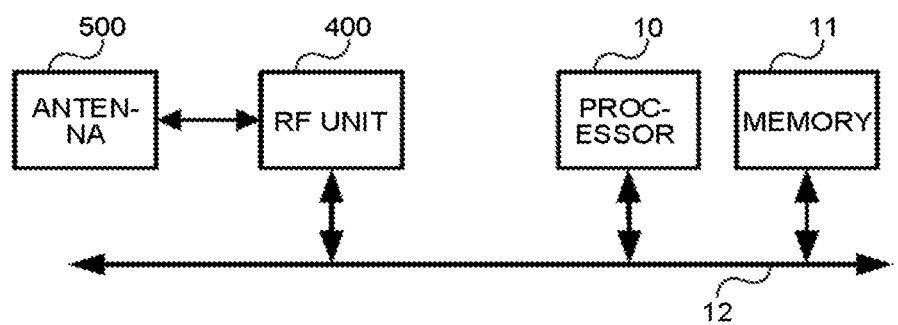
FIG. 9 is a block diagram illustrating an exemplary hardware configuration in a case where the wireless communication device according to the first embodiment is configured using a processor.

The wireless control unit 100, the transmitter 200, the receiver 300, and the initial value setting unit 600 can also be implemented by a processor and a program executed by the processor. These components can also be implemented by a combination of hardware such as an ASIC and software. FIG. 9 is a block diagram illustrating an exemplary hardware configuration in a case where the wireless communication device 1 is implemented using a processor. In this example, a program having the functions of the wireless control unit 100, the transmitter 200, the receiver 300, the RF unit 400, and the initial value setting unit 600 is stored in a memory 11, and the processor 10 executes the program using the memory 11. A bus 12 is a signal line connecting the processor 10, the RF unit 400, and the memory 11.

Figure 2:
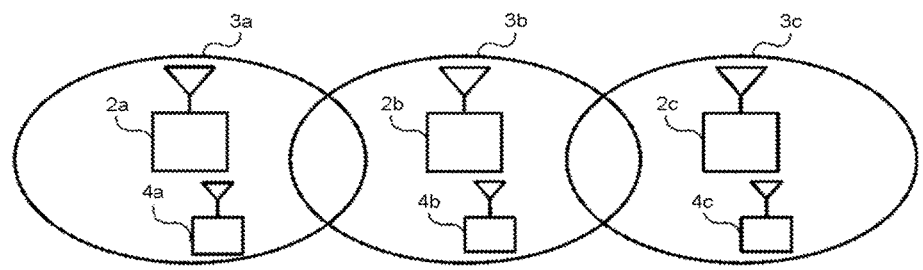
FIG. 2 is a block diagram illustrating an exemplary configuration of a wireless communication system in which the wireless communication device according to the first embodiment is used.

FIG. 2 is a block diagram illustrating an exemplary configuration of a wireless communication system in which the wireless communication device 1 according to the present embodiment is used. In FIG. 2, base stations 2 (2a, 2b, and 2c) having the wireless communication devices 1 form cells 3 (3a, 3b, and 3c). Terminals 4 (4a, 4b, and 4c) having the wireless communication devices 1 communicate with the base stations 2 (2a, 2b, and 2c) forming the cells 3 (3a, 3b, and 3c) in which the terminals 4 are located.

Next, the operation of the wireless communication device 1 according to the present embodiment will be described. First, the operation of the wireless communication device 1 at the time of transmission will be described. The wireless control unit 100 outputs, to the transmitter 200, the transmission data that is to be transmitted wirelessly. In the transmitter 200 to which the transmission data have been input, first, the encoder 201 performs the convolutional encoding on the transmission data. Next, the interleaver 202 interleaves the transmission data having been subjected to the convolutional encoding. The interleaver 202 can interleave the transmission data, for example, by writing the data to a two-dimensional array of a matrix in the row direction and reading the data in the column direction.

Figure 3:
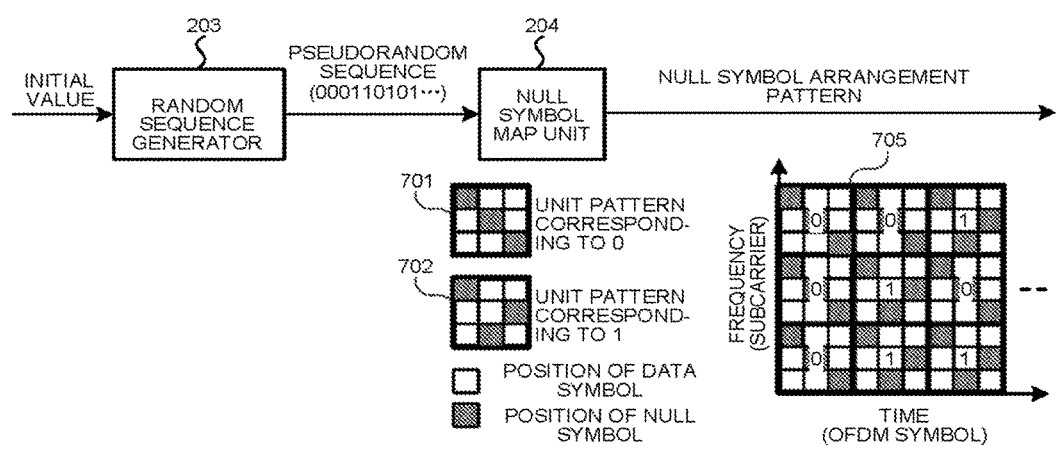
FIG. 3 is a schematic diagram for explaining a procedure for determining a null symbol arrangement pattern according to the first embodiment.

Next, the operation of the random sequence generator 203 and the null symbol map unit 204 will be described. FIG. 3 is a schematic diagram illustrating the details of the operation of the random sequence generator 203 and the null symbol map unit 204. On the basis of the initial value input from the initial value setting unit 600, the random sequence generator 203 generates the pseudorandom sequence represented by, for example, an M-sequence, a Gold sequence, and the like. At this time, different initial values are provided by the initial value setting units 600 to the random sequence generators 203 in the adjacent cells. As a result, the random sequence generators 203 of the wireless communication devices 1 located in the adjacent cells can generate different pseudorandom sequences for the respective cells. For example, in a case where the cells 3 (3a, 3b, and 3c) are formed as illustrated in FIG. 2, one initial value is set in the cells 3a and 3c, and another initial value is set in the cell 3b. Alternatively, different initial values may be provided to the respective cells 3a, 3b, and 3c. If numbers are allocated to the cells 3 as identifiers, the identifier numbers may be used.

The base stations 2 (2a, 2b, and 2c) forming the respective cells 3 store the initial values set in the corresponding cells 3, whereby the wireless communication devices 1 provided in the base stations 2 can use the initial values set in the corresponding cells 3. In the case of the wireless communication device 1 provided in the terminal 4, the initial value may be transmitted from the base station 2 as annunciation information, or the cell 3 in which the terminal 4 is located may be specified from information on the current position of the terminal 4, whereby the initial value is determined. The random sequence generator 203 may repeat the generation of pseudorandom sequence based on the initial value for each OFDM frame, or repeat the generation for each superframe made of a plurality of OFDM frames. Alternatively, if the generation of the pseudorandom sequence on the transmission side can be synchronized with the generation of the pseudorandom on the reception side, the pseudorandom sequence may be generated in a longer cycle.

Next, the null symbol map unit 204 determines the null symbol arrangement pattern in accordance with the pseudorandom sequence generated by the random sequence generator 203. The null symbol map unit 204 holds different unit patterns 701 and 702 as illustrated in FIG. 3. In the example of FIG. 3, the unit patterns 701 and 702 correspond to '0' and '1' of the pseudorandom sequence, respectively. Each unit pattern represents an array of three rows and three columns. Each of nine array elements corresponds to a data symbol or a null symbol. In the example of FIG. 3, hatched array elements indicate the positions of the null symbols, and unhatched array elements indicate the positions of the data symbols. As illustrated in FIG. 3, the null symbol map unit 204 determines a null symbol arrangement pattern 705 by combining the unit patterns in accordance with the pseudorandom sequence generated by the random sequence generator 203.

The null symbol arrangement pattern 705 illustrated in FIG. 3 indicates exemplary OFDM symbols generated from nine subcarriers, and is the arrangement pattern in a case where the pseudorandom sequence '000110101' is output from the random sequence generator 203. In FIG. 3, '0' or '1' is attached to each unit pattern for the sake of convenience so as to represent which unit patterns are combined to form the null symbol arrangement pattern 705.

Although the unit pattern in FIG. 3 is the array of three rows and three columns, the present invention is not limited to this example. Both the number of rows and the number of columns may be other than three, and the number of rows and the number of columns may be different from each other. The number of rows of the unit pattern does not need to be a divisor of the number of subcarriers for the OFDM symbols. The number of unit patterns is not limited to two, and three or more different unit patterns may be used. In a case where three or more unit patterns are used, where necessary, the pseudorandom sequence may be divided into sets of two or more bits, and the respective sets may be associated with the unit patterns. For example, if the number of unit patterns is four, the pseudorandom sequence may be divided into sets of two bits, and the unit patterns may be associated with '00', '01', '10', and '11'.

The subcarrier map unit 205 having received the input of the null symbol arrangement pattern determined by the null symbol map unit 204 assigns, to the positions of the data symbols, the interleaved transmission data output from the interleaver 202, in accordance with the input null symbol arrangement pattern. The modulator 206 then performs the phase modulation on the transmission data assigned to the positions of the data symbols on an OFDM-symbol basis, and generates the data symbols made of I data and Q data. At this time, at the positions of the null symbols, the modulator 206 sets both the I data and the Q data to 0 as the null symbols. Through this process, the modulator 206 generates the data symbols and the null symbols, namely, the transmission symbols.

Next, the IFT unit 208 uses the IFFT to perform the Fourier transform on the transmission symbols on the OFDM-symbol basis. Then, the GI addition unit 209 adds the GI to generate the OFDM symbol. The transmission filter 210 performs the filtering process on the OFDM symbol output from the GI addition unit 209 to generate the baseband signal, and outputs the generated baseband signal to the RF unit 400. The RF unit 400 performs the DA conversion, the frequency conversion, and the signal amplification on the baseband signal input from the transmitter 100, and outputs, to the antenna 500, the radio signal that is to be transmitted. Then, the antenna 500 wirelessly transmits the signal input from the transmitter 200.

Figure 4:
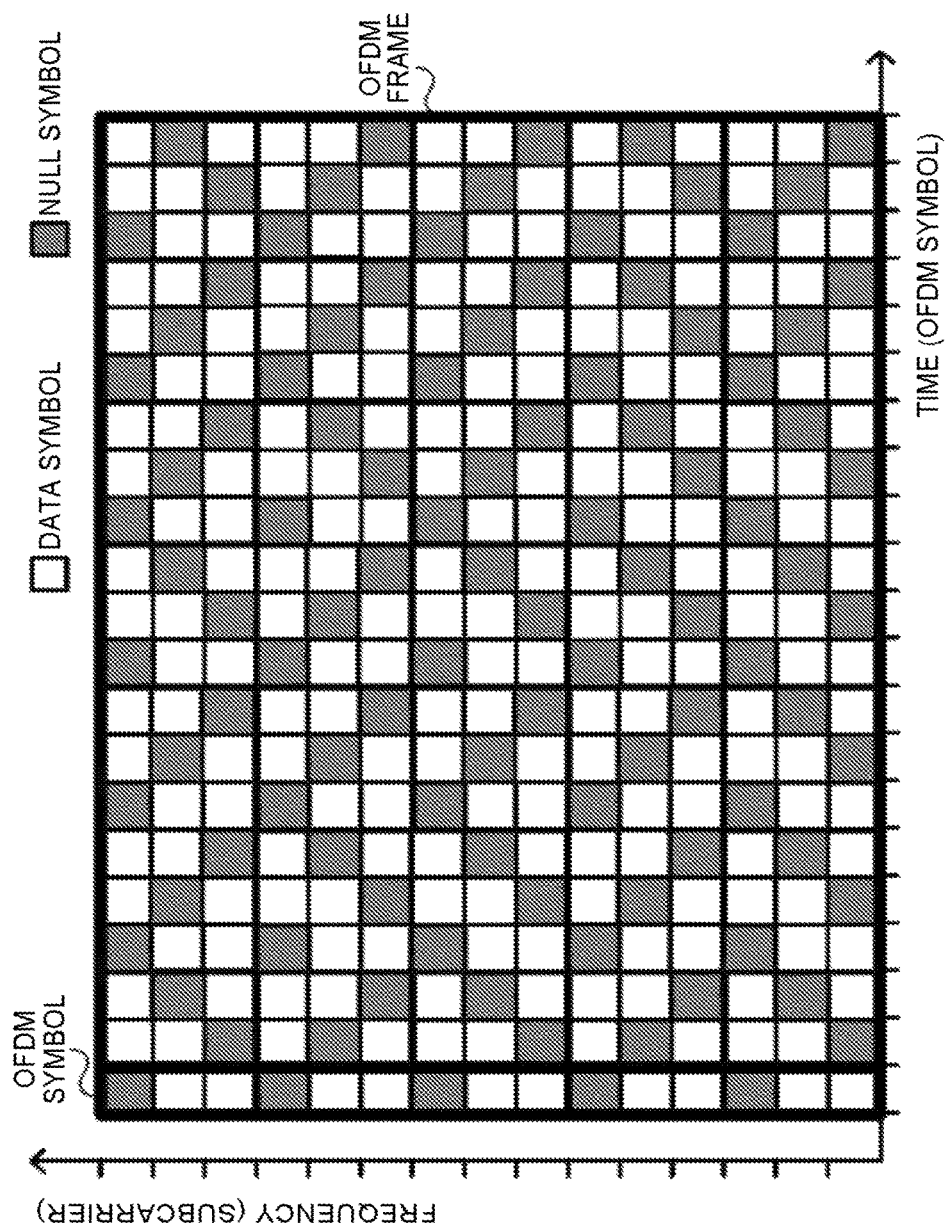
FIG. 4 is a schematic diagram illustrating an example of transmission symbols included in OFDM symbols and an OFDM frame.

FIG. 4 is an example of an OFDM symbol including fifteen transmission symbols and an OFDM frame including twenty one OFDM symbols. The example of FIG. 4 indicates an image of the transmission symbols that are transmitted by each of the OFDM symbols and the OFDM frame.

Next, the operation of the wireless transmission device 1 at the time of reception according to the present invention will be described. The antenna 500 inputs the received radio signal to the RF unit 400. The RF unit 400 performs the frequency conversion and the AD conversion on the input wireless signal to thereby generate the baseband signal, and inputs the generated baseband signal to the receiver 300. In the receiver 300, first, the reception filter 302 performs the filtering process on the input baseband signal to remove the out-of-band component from the baseband signal, and inputs the baseband signal to the synchronization control unit 303.

The synchronization control unit 303 synchronizes the timing and frequency of the baseband signal subjected to the filtering process by the reception filter 302. During the synchronization of the frequency, the synchronization control unit 303 obtains a frequency deviation caused by a difference between oscillators on the transmission side and the reception side or by a frequency deviation caused by the Doppler frequency associated with movement, and corrects the input baseband signal on the basis of the obtained deviation. During the synchronization of the timing, the synchronization control unit 303 performs, on the input baseband signal, a process for determining the timing of the boundary of the OFDM symbol. As described above, these processes of synchronization can be performed simply by using a known synchronization method such as the use of a pilot signal known to the transmission side and the reception side and transmitted with a preamble.

Next, the baseband signal subjected to the synchronization process by the synchronization control unit 303 is input to the GI removal unit 304. The GI removal unit 304 removes the GI from the OFDM symbol of the baseband signal subjected to the synchronization process, and inputs the resulting signal to the FT unit 305. The FT unit 305 then uses the FFT to perform the Fourier transform on the input signal from the GI removal unit 304, thereby converting this signal into the frequency domain signal, and thus acquiring the reception symbols of the respective subcarriers.

The random sequence generator 310 and the null symbol map unit 311 that are provided in the receiver 300 operate in the same way as the random sequence generator 203 and the null symbol map unit 204 that are provided in the transmitter 200, respectively, thereby determining the null symbol arrangement pattern. Upon receiving the input of the reception symbols from the FT unit 305, the interference measuring unit 306 measures the power of the null symbol of the reception symbols (interference power of the null symbol) on the basis of the input null symbol arrangement pattern, and uses the measured interference power of the null symbol to obtain the interference power (interference power of the data symbol) that is used for weighting the data symbol of the reception symbols.

Figure 5:
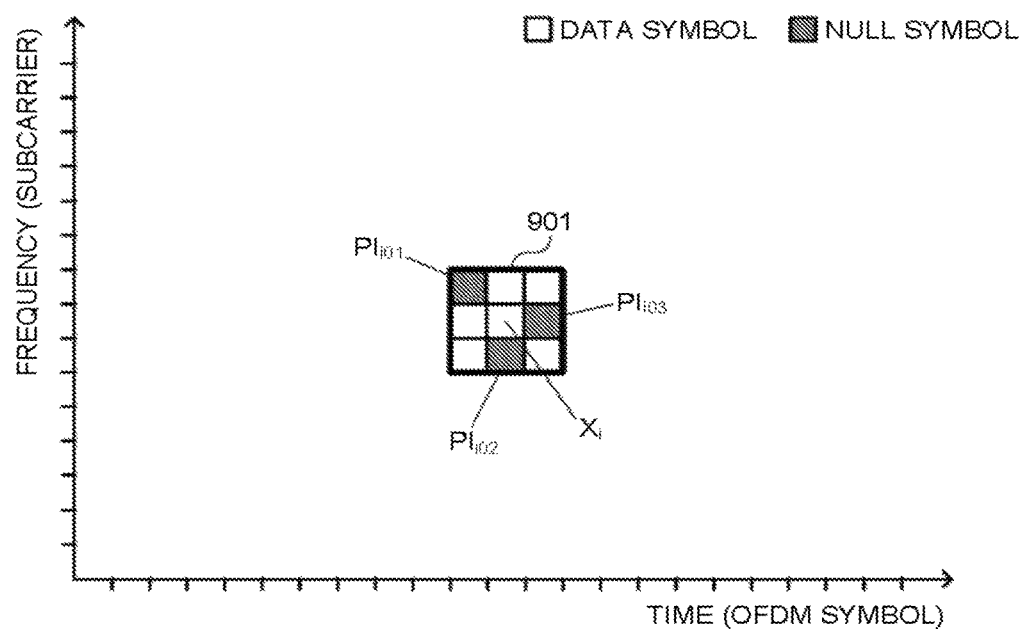
FIG. 5 is a schematic diagram for explaining an example of how to obtain the interference power of a data symbol.

An example of how to obtain the interference power of the data symbol will be described with reference to FIG. 5. In this example, the interference power of a data symbol $X_i$ illustrated in FIG. 5 is obtained. First, the interference power $PI_{i0}$ of a nine-symbol region 901 made of the data symbol $X_i$ whose interference power is to be measured and eight data and null symbols around the data symbol $X_i$ is obtained using Formula 1 below. Note that $PI_{i01}$, $PI_{i02}$, and $PI_{i03}$ are the interference powers of the three null symbols around the data symbol $X_i$.

[Formula 1]

$$PI_{i0} = \frac{PI_{i01} + PI_{i02} + PI_{i03}}{3} \quad (1)$$

Figure 6:
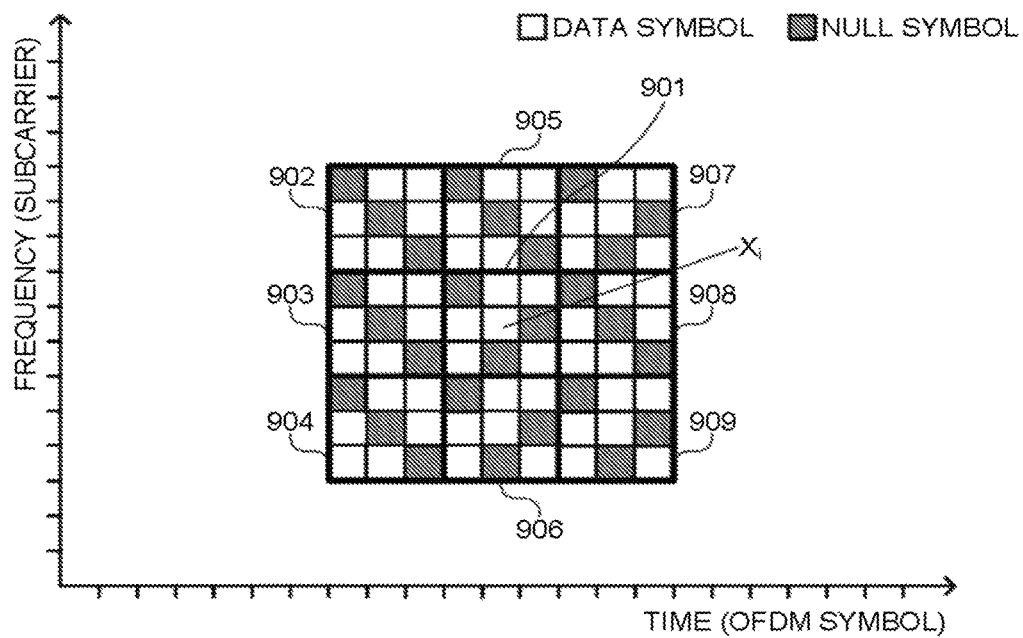
FIG. 6 is a schematic diagram for explaining the example of how to obtain the interference power of the data symbol.

As illustrated in FIG. 6, the interference powers $PI_{i1}$ to $PI_{i8}$ of eight nine-symbol regions 902 to 909 around the nine-symbol region 901 centering the data symbol $X_i$ are similarly calculated using Formula 1. Then, using the obtained interference powers $PI_{i0}$ to $PI_{i8}$, the interference power $PI_i$ which is the interference amount for weighting the data symbol $X_i$ is obtained using Formula 2 below. Note that a, b, and c are weighting coefficients for the interference powers of the respective regions.

[Formula 2]

$$PI_i = a \cdot PI_{i0} + b \cdot (PI_{i2} + PI_{i4} + PI_{i5} + PI_{i7}) + c \cdot (PI_{i1} + PI_{i3} + PI_{i6} + PI_{i8}) \quad (2)$$

Next, the detector 307 detects (demodulates) the data symbol of the reception symbols, weights the demodulated data with the interference amount obtained by the interference power measuring unit 306, and outputs this weighted data to the deinterleaver 308. The deinterleaver 308 rearranges the input weighted demodulated data in the order opposite the order in which the interleaving is performed on the transmission side. The deinterleaver 308 then outputs this rearranged data to the decoder 309. The decoder 309 performs the error correction process on the input weighted demodulated data by using the Viterbi algorithm. At this time, the decoder 309 performs the Viterbi decoding process taking into consideration the interference amount that is the weight given to the data to be decoded. This interference amount is taken into consideration so that the likelihood is low when the interference amount is large, and the likelihood is high when the interference amount is small. By performing such a decoding process, thus, the decoder 309 can appropriately perform the error correction without erroneously with a high likelihood when the interference is large. The data subjected to the error correction are output to the wireless control unit 100 as the reception data.

As described above, according to the transmitter of the present embodiment, at least two different unit patterns that determine the positions of the null symbols and the positions of the data symbols are held, and the unit patterns are combined, whereby the null symbol arrangement pattern for the respective subcarriers of the OFDM symbols is determined. Therefore, it is unnecessary to store the null symbol arrangement pattern more than the unit pattern over a plurality of OFDM symbols, and the amount of memory can be reduced.

The transmitter of the present embodiment includes the random sequence generator for generating the pseudorandom sequence corresponding to the given initial value, and the null symbol map unit combines the unit patterns to determine the null symbol arrangement pattern on the basis of the pseudorandom sequence generated by the random sequence generator. Therefore, in a case where the service areas (cells) of the own system or other systems overlap each other, the different initial values are given to the random sequence generators located in the respective cells, whereby the different null symbol arrangement patterns can be easily obtained in the respective cells. Consequently, a signal transmitted from the base station or terminal located in another cell can be regarded as the interference power in the receiver, and the interference power can be measured with a high degree of accuracy even when the cells of the own system or other systems overlap each other.

According to the receiver of the present embodiment, at least two different unit patterns that determine the positions of the null symbols and the positions of the data symbols are held, and the unit patterns are combined, whereby the null symbol arrangement pattern for the respective subcarriers acquired from the OFDM symbols is determined. Therefore, it is unnecessary to store the null symbol arrangement pattern more than the unit pattern over a plurality of OFDM symbols, and the amount of memory can be reduced.

The receiver of the present embodiment includes the random sequence generator for generating the pseudorandom sequence corresponding to the given initial value, and the null symbol map unit combines the unit patterns to determine the null symbol arrangement pattern on the basis of the pseudorandom sequence generated by the random sequence generator. Therefore, in a case where the service areas (cells) of the own system or other systems overlap each other, the different initial values are given to the random sequence generators located in the respective cells, whereby the different null symbol arrangement patterns can be easily obtained in the respective cells. Consequently, a signal transmitted from the base station or terminal located in another cell can be regarded as the interference power, and the interference power can be measured with a high degree of accuracy even when the cells of the own system or other systems overlap each other.

The transmitter and the receiver of the present embodiment do not need to store a plurality of null symbol arrangement patterns entirely in order to provide different null symbol arrangement patterns in the respective cells. Therefore, the transmitter and the receiver of the present embodiment can be implemented using a small amount of memory, as compared with a transmitter and a receiver which store a plurality of null symbol arrangement patterns entirely.

In a case where cells of the own system or other systems overlap each other, and the null symbol arrangement patterns are changed after the devices are operated so that different null symbol arrangement patterns are provided in the respective cells, it is only required that the initial values to be given to the random sequence generators are changed. Therefore, it is advantageously unnecessary to store a plurality of null symbol arrangement patterns entirely or change the stored null symbol arrangement patterns entirely.

It is also possible to easily increase or decrease the number of null symbols simply by updating and changing the unit patterns.

Second Embodiment

Figure 7:
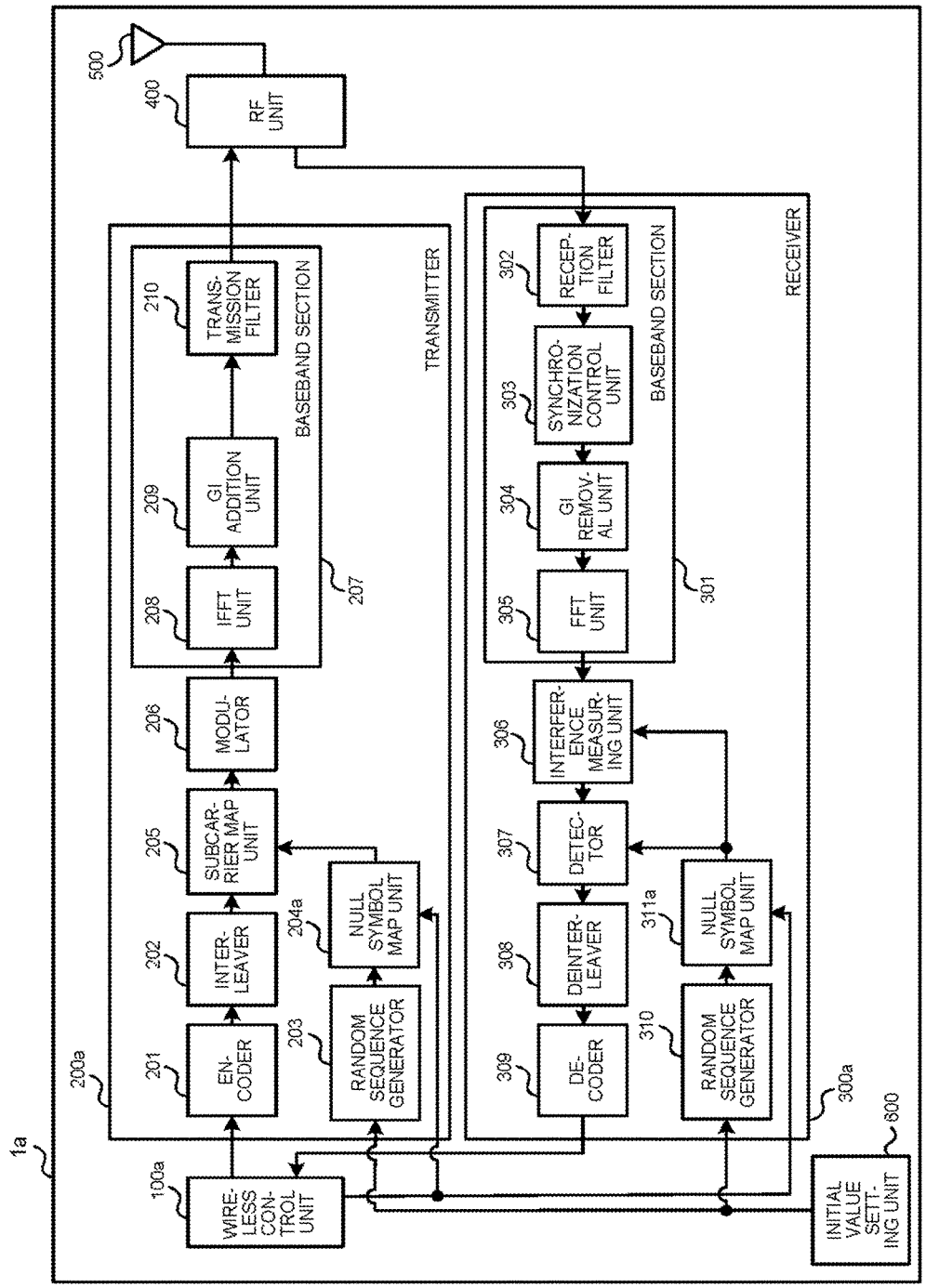
FIG. 7 is a block diagram illustrating an exemplary functional configuration of a wireless communication device to which a transmitter and a receiver according to a second embodiment of the present invention are applied.

Next, a transmitter and a receiver according to a second embodiment of the present invention will be described. In the present embodiment, the null symbol arrangement pattern for the transmission symbols is changed in accordance with the transmission rate. FIG. 7 is a block diagram illustrating an exemplary functional configuration of a wireless communication device of the present embodiment. The components similar to those of the first embodiment are denoted by the reference signs identical to those of FIG. 1. In the wireless communication device 1a of the present embodiment, a wireless control unit 100a inputs a signal (rate instruction signal) indicating whether the transmission rate is high or low to a null symbol map unit 204a of the transmitter 200a and a null symbol map unit 311a of the receiver 300a. The wireless control unit 100a holds the state indicating whether the transmission rate is high or low as a parameter at the start of the device, and the same parameter is used on the transmission side and the reception side.

Figure 8:
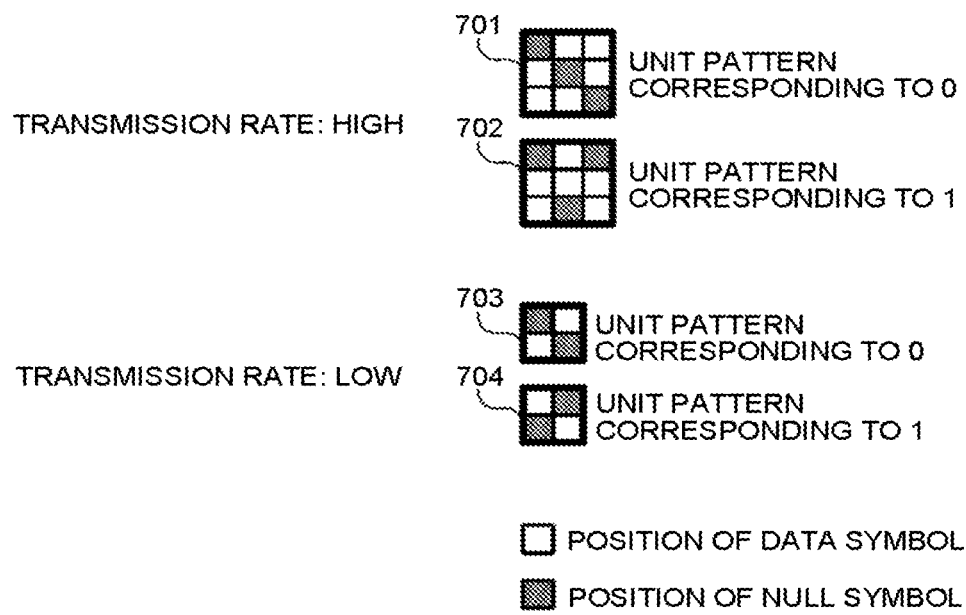
FIG. 8 is a schematic diagram for explaining unit patterns held by a null symbol map unit of the transmitter according to the second embodiment.

As illustrated in FIG. 8, the null symbol map units 204a and 311a hold low-speed unit patterns 703 and 704 in addition to the high-speed unit patterns 701 and 702 similar to those illustrated in the first embodiment. In this example, the unit pattern 703 corresponds to '0' of the pseudorandom sequence, and the unit pattern 704 corresponds to '1' of the pseudorandom sequence. The null symbol map units 204a and 311a change the unit patterns to be used for determining the null symbol arrangement pattern in accordance with the rate instruction signal from the wireless control unit 100a.

The following paragraphs describe the operation, in particular differences from the first embodiment. The operation of each of the encoder 201, the interleaver 202, the random sequence generation unit 203, the subcarrier map unit 205, the modulator 206, the IFT unit 208, the GI addition unit 209, and the transmission filter 210 of the transmitter 200a is similar to that in the first embodiment. The operation of each of the reception filter 302, the synchronization control unit 303, the GI removal unit 304, the FT unit 305, the interference measuring unit 306, the detection unit 307, the deinterleaver 308, the decoder 309, and the random sequence generation unit 310 of the receiver 300a is similar to that in the first embodiment. The operation of each of the RF unit 400 and the antenna 500 is similar to that in the first embodiment.

When determining the null symbol arrangement pattern in accordance with the pseudorandom sequence output from the random sequence generator 203, the null symbol map units 204a and 311a of the present embodiment use the unit patterns in response to the rate instruction signal input from the wireless control unit 100a. In particular, the null symbol map units 204a and 311a use the unit patterns 701 and 702 if the transmission rate is high, and use the unit patterns 703 and 704 if the transmission rate is low. In the present embodiment, the null symbols are inserted so that the data symbols and the null symbols are in the ratio of 2:1 if the transmission rate is high, and the data symbols and the null symbols are in the ratio of 1:1 if the transmission rate is low.

Since the number of required data symbols is small if the transmission rate is low, a large number of the null symbols can be inserted while the influence on the transmission rate is suppressed to a low level, whereby the interference power of the data symbol can be measured on the reception side with a higher degree of accuracy. In a case where the transmission power of each OFDM symbol is fixed, if the transmission rate is low and a large number of the null symbols are inserted, the power of the data symbol in the OFDM symbol increases and, thus, the signal-to-noise power ratio is advantageously improved.

As described above, the wireless communication device of the present invention is configured so that the unit patterns having different densities of the null symbols are used in accordance with the transmission rate. Therefore, the unit patterns for use are switched in accordance with the system in which the wireless communication device is used. In the system with a low transmission rate, a large number of the null symbols are inserted when only a small number of the data symbols are required due to the transmission rate, whereby the quality of communication can be improved.

In this example, whether the transmission rate is high or low is determined in accordance with the parameter predetermined in the system. Alternatively, whether the transmission rate is high or low may be dynamically changed during the communication. For example, in the case of a system in which a wireless transmission frame includes a plurality of slots, and a slot for transmitting control information and a slot for transmitting user information are determined in advance, the wireless control unit may output a signal indicating a low transmission rate at the timing of the slot of the control information, and output a signal indicating a high transmission rate at the timing of the slot of the user information.

Alternatively, a flag indicating a high or low transmission rate may be transmitted as header information of the transmission frame, and the wireless control unit on the reception side may be configured to output, to the reception unit, a signal indicating a high or low transmission rate in accordance with such information. In this case, for example, the low transmission rate may be set at the timing of transmitting the header information, and the transmission rate of the part other than the header information may be switched in accordance with the designation of the low or high transmission rate included in the header information.

In the example described in the second embodiment, two kinds of transmission rates, namely, the high and low transmission rates, are defined. Alternatively, other patterns having different densities of null symbols may be further prepared, so that the insertion of the null symbols is more precisely performed in accordance with the transmission rate.

INDUSTRIAL APPLICABILITY

Since the transmitter and the receiver of the present invention can determine the null symbol arrangement pattern by using a combination of the unit patterns that determine the arrangement of the null symbols and the data symbols, the wireless communication device does not need to include a large amount of memory in order to store the null symbol arrangement pattern. The transmitter and the receiver of the present invention are useful for the wireless communication device for measuring the wireless power related to the communication in another service area as the interference power in a case where the service areas overlap each other, and eliminating the influence of the interference power to improve the communication performance.

REFERENCE SIGNS LIST

1 wireless communication device, 100, 100a wireless control unit, 200, 200a transmitter, 201 encoder, 202 interleaver, 203 random sequence generator, 204, 204a null symbol map unit, 205 subcarrier map unit, 206 modulator, 207 baseband section, 208 inverse Fourier transform unit (IFT unit), 209 interval addition unit (GI addition unit), 210 transmission filter, 300, 300a receiver, 301 baseband section, 302 reception filter, 303 synchronization control unit, 304 GI removal unit, 305 Fourier transform unit (FT unit), 306 interference measuring unit, 307 detection unit, 308 deinterleaver, 309 decoder, 310 random sequence generation unit, 311, 311a null symbol map unit, 400 wireless signal unit (RF unit), 500 antenna.

The invention claimed is:

1. A transmitter comprising:
   processing circuitry:
   to determine a null symbol arrangement pattern in a two-dimensional space by arranging one of at least two different unit patterns in each of parts of the two-dimensional space and combining the at least two different unit patterns determining positions of data symbols and null symbols, the two-dimensional space being divided into the parts each having a size of the unit pattern, the two-dimensional space being defined by a plurality of subcarriers for use in multicarrier transmission and a time series represented in units of time determined in accordance with a single symbol, wherein the unit pattern is a combination of a plurality symbols defined having a dimensional size defined by a number of rows and columns of symbols which include the data symbols and the null symbols, each unit pattern as a whole representing a different digital data value;
   to assign, in the two-dimensional space, transmission data to positions of data symbols of the respective subcarriers determined in accordance with the null symbol arrangement pattern;
   to generate the data symbols by modulating the transmission data assigned to the respective subcarriers, assign null symbols having a power of 0 to positions of null symbols of the respective subcarriers determined in accordance with the null symbol arrangement pattern, and generate transmission symbols of the respective subcarriers;
   to output a baseband signal on a basis of the generated transmission symbols; and
   to generate a pseudorandom sequence on a basis of an initial value, wherein
   the processing circuitry determines the null symbol arrangement pattern by combining the unit patterns on a basis of the pseudorandom sequence.

2. The transmitter according to claim 1, wherein
   the processing circuitry switches the unit patterns to change the dimensional size of the unit pattern for use in determining the null symbol arrangement pattern in accordance with a transmission rate.

3. A receiver comprising:
   processing circuitry:
   to acquire, from a baseband signal, reception symbols of respective ones of a plurality of subcarriers for use in multicarrier transmission;
   to determine a null symbol arrangement pattern in a two-dimensional space by arranging one of at least two different unit patterns in each of parts of the two-dimensional space and combining the at least two different unit patterns, the processing circuitry having the at least two different unit patterns, the at least two different unit patterns determining positions of data symbols and null symbols, the two-dimensional space being divided into the parts each having a size of the unit pattern, the two-dimensional space being defined by the plurality of subcarriers and a time series represented in units of time determined in accordance with a single symbol, wherein the unit pattern is a combination of a plurality symbols defined having a dimensional size defined by a number of rows and columns of symbols which include the data symbols and the null symbols, each unit pattern as a whole representing a different digital data value;
   to measure powers of null symbols of the reception symbols of the respective subcarriers on a basis of the null symbol arrangement pattern, and acquire interference powers of data symbols of the reception symbols on a basis of the powers of the null symbols measured; and
   to generate a pseudorandom sequence on a basis of an initial value, wherein
   the processing circuitry determines the null symbol arrangement pattern by combining the unit patterns on a basis of the pseudorandom sequence.

4. The receiver according to claim 3, wherein
   the processing circuitry switches the unit patterns to change the dimensional size of the unit pattern for use in determining the null symbol arrangement pattern in accordance with a transmission rate.

* * * * *